United States Patent
Ikeda et al.

(10) Patent No.: US 11,892,944 B2
(45) Date of Patent: Feb. 6, 2024

(54) ANOMALY FACTOR ESTIMATION APPARATUS, ANOMALY FACTOR ESTIMATION METHOD AND PROGRAM

(71) Applicant: Nippon Telegraph and Telephone Corporation, Tokyo (JP)

(72) Inventors: Yasuhiro Ikeda, Tokyo (JP); Keisuke Ishibashi, Tokyo (JP); Kengo Tajiri, Tokyo (JP); Yusuke Nakano, Tokyo (JP); Keishiro Watanabe, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 467 days.

(21) Appl. No.: 17/267,084

(22) PCT Filed: Jan. 15, 2019

(86) PCT No.: PCT/JP2019/000928
§ 371 (c)(1),
(2) Date: Feb. 9, 2021

(87) PCT Pub. No.: WO2020/039610
PCT Pub. Date: Feb. 27, 2020

(65) Prior Publication Data
US 2021/0311863 A1    Oct. 7, 2021

(30) Foreign Application Priority Data
Aug. 20, 2018  (JP) .................. 2018-154189

(51) Int. Cl.
*G06F 11/00*  (2006.01)
*G06F 11/36*  (2006.01)
*G06N 20/00*  (2019.01)

(52) U.S. Cl.
CPC ...... *G06F 11/3688* (2013.01); *G06F 11/3692* (2013.01); *G06N 20/00* (2019.01)

(58) Field of Classification Search
CPC .. G06F 11/3688; G06F 11/3692; G06N 20/00
(Continued)

(56) References Cited

U.S. PATENT DOCUMENTS

| | | | |
|---|---|---|---|
| 10,635,519 B1 * | 4/2020 | Tang ................. | G06F 11/3447 |
| 2008/0034258 A1 * | 2/2008 | Moriya .............. | G05B 23/0297 |
| | | | 714/57 |

(Continued)

OTHER PUBLICATIONS

Hodge et al., "A Survey of Outlier Detection Methodologies," Artificial Intelligence Review, 2004, 22:85-126.

(Continued)

*Primary Examiner* — Sarai E Butler
(74) *Attorney, Agent, or Firm* — Fish & Richardson P.C.

(57) ABSTRACT

An anomaly factor estimation apparatus includes a memory and a processor configured to execute training an anomaly detection model for performing anomaly detection based on an error of output data with respect to input data represented by a multidimensional numerical vector; inputting test data into the anomaly detection model, to determine whether the test data corresponds to an anomaly based on output data output from the anomaly detection model and the test data; and calculating a degree of contribution to the anomaly for each dimension of the test data based on a likelihood of said each dimension, in response to determining that the test data corresponds to the anomaly.

9 Claims, 9 Drawing Sheets

(58) Field of Classification Search
USPC .................................................... 714/1–57
See application file for complete search history.

(56) References Cited

U.S. PATENT DOCUMENTS

| | | | | |
|---|---|---|---|---|
| 2008/0263410 | A1* | 10/2008 | Mittal | G06F 11/3414 |
| | | | | 714/47.2 |
| 2011/0060708 | A1* | 3/2011 | Suzuki | G06N 20/00 |
| | | | | 706/12 |
| 2013/0042148 | A1* | 2/2013 | Fujimaki | G06F 11/079 |
| | | | | 714/37 |
| 2015/0309918 | A1* | 10/2015 | Raghavan | G06F 11/3688 |
| | | | | 714/38.1 |
| 2016/0162346 | A1* | 6/2016 | Kushnir | G06F 11/079 |
| | | | | 714/37 |
| 2018/0060150 | A1* | 3/2018 | Cunico | G06F 3/013 |
| 2018/0196942 | A1* | 7/2018 | Kashyap | G06F 21/53 |
| 2018/0218261 | A1* | 8/2018 | Myara | G06N 3/045 |
| 2018/0293713 | A1* | 10/2018 | Vogels | G06F 18/2113 |

OTHER PUBLICATIONS

Ikeda et al., "Inferring causal parameters of anomalies detected by autoencoder using sparse optimization," IEICE, Technical Report, Jun. 8, 2017, 117(89):61-66, 12 pages (with English Translation).

Sakurada et al., "Dimensionality Reduction with the Autoencoder for Anomaly Detection of Spacecrafts," The 28th Annual Conference of the Japanese Society for Artificial Intelligence, 2014, pp. 1-3, 6 pages (with English Translation).

Sonoda et al., "Transportation aspect of infinitely deep denoising autoencoder," IEICE, Technical Report, Nov. 9, 2016, 116(300):297-304, 19 pages (with English Translation).

Tanaka et al., "Missing value complementing method for information recommendation using deep learning," Proceedings of Forum on DEIM, 2016, pp. 1-6, 16 pages (with English Translation).

\* cited by examiner

ANOMALY FACTOR ESTIMATION APPARATUS, ANOMALY FACTOR ESTIMATION METHOD AND PROGRAM

CROSS-REFERENCE TO RELATED APPLICATIONS

This application is a National Stage application under 35 U.S.C. § 371 of International Application No. PCT/JP2019/000928, having an International Filing Date of Jan. 15, 2019, which claims priority to Japanese Application Serial No. 2018-154189, filed on Aug. 20, 2018. The disclosure of the prior application is considered part of the disclosure of this application, and is incorporated in its entirety into this application.

TECHNICAL FIELD

The present invention relates to techniques for analyzing numerical data collected in a system in real time to detect anomalies of the system.

BACKGROUND ART

In a system having a function of observing various items of data in real time, an algorithm that uses data in normal time to learn the correlation between metrics in normal time, so as to output the "degree of anomalousness" of test data in the case where the correlation between the metrics in normal time is disrupted in the test data, has been proposed (Non-patent document 1 and Non-patent document 2).

RELATED ART DOCUMENTS

Non-Patent Documents

[Non-patent document 1] Hodge, Victoria J., and Jim Austin. "A survey of outlier detection methodologies", Artificial intelligence review 22.2 (2004): 85-126.
[Non-patent document 2] Mayu Sakurada and Takehisa Yairi, "Dimensionality Reduction with the Autoencoder for Anomaly Detection of Spacecrafts", The 28th Annual Conference of the Japanese Society for Artificial Intelligence, 1-3, 2014
[Non-patent document 3] Yasuhiro Ikeda, Keisuke Ishibashi, Yusuke Nakano, Keishiro Watanabe, and Ryoichi Kawahara, "Inferring causal parameters of anomalies detected by autoencoder using sparse optimization", IEICE, vol. 117, no. 89, IN2017-18, pp. 61-66, June, 2017.

SUMMARY OF INVENTION

Problem to be Solved by the Invention

Such an algorithm has an advantage of being capable of determining the presence or absence of an anomaly using a one-dimensional metric of "degree of anomalousness", even in the case where there is a large amount of data to be observed; however, in the case where it is determined that there is an anomaly, it is not possible to know which observed data item causes the anomaly. With respect to this problem, as a method of estimating an observed data item as a factor, a method has been proposed that searches for input data items that makes the degree of anomalousness smaller by sparse optimization, and determines dimensions in which the error between the searched vector and the vector of test data is non-zero, as the factors (Non-patent document 3).

FIGS. 1 and 2 illustrate anomaly detection by such a method, where FIG. 1 illustrates the case where the factors are narrowed down to part of dimensions, and FIG. 2 illustrates the case where the factors spread over many dimensions. This method requires an assumption of sparsity that the dimensions as the factors of an anomaly constitute a fractional part of all dimensions; therefore, as illustrated in FIG. 2, in the case where the factors spread over many dimensions, there has been a problem that the factor estimation is not calculated correctly by the sparse optimization, and it is not possible to correctly extract only the factor dimensions.

The present invention has been made in view of the above, and has an object to provide, in a technical field of detecting an anomaly of data represented by multidimensional numeric vectors, a technique that can extract the factor dimensions of an anomaly without assuming sparsity of the factor dimensions of the anomaly.

Means for Solving the Problem

According to the disclosed techniques, an anomaly factor estimation apparatus is provided to include a training unit configured to train an anomaly detection model for performing anomaly detection based on an error of output data with respect to input data represented by a multidimensional numerical vector; a testing unit configured to input test data into the anomaly detection model, to determine whether the test data corresponds to an anomaly based on output data output from the anomaly detection model and the test data; and a factor estimation unit configured to calculate a degree of contribution to the anomaly for each dimension of the test data based on a likelihood of said each dimension, in response to the testing unit determining that the test data corresponds to the anomaly.

Advantage of the Invention

According to the disclosed techniques, in a technical field of detecting an anomaly of data represented by multidimensional numeric vectors, a technique that can extract the factor dimensions of an anomaly without assuming the sparsity of the factor dimensions of the anomaly is provided.

EMBODIMENTS OF THE INVENTION

In the following, an embodiment according to the present invention (the present embodiment) will be described with reference to the drawings. The embodiment described below is merely an example, and the embodiment to which the present invention applies is not limited to the following embodiment.

(Device Configuration)

Figure 1:
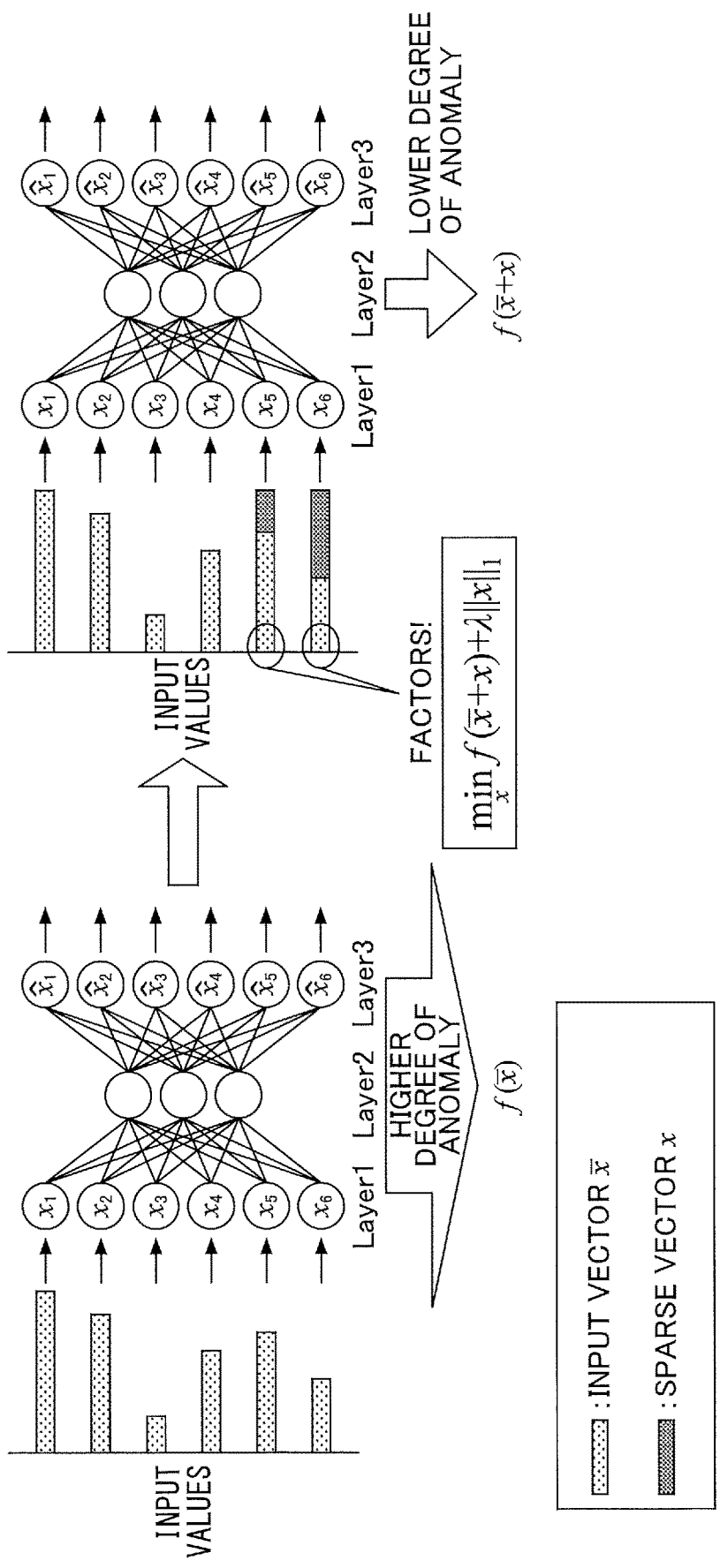
FIG. 1 is a diagram for illustrating the problem to be solved.
Figure 2:
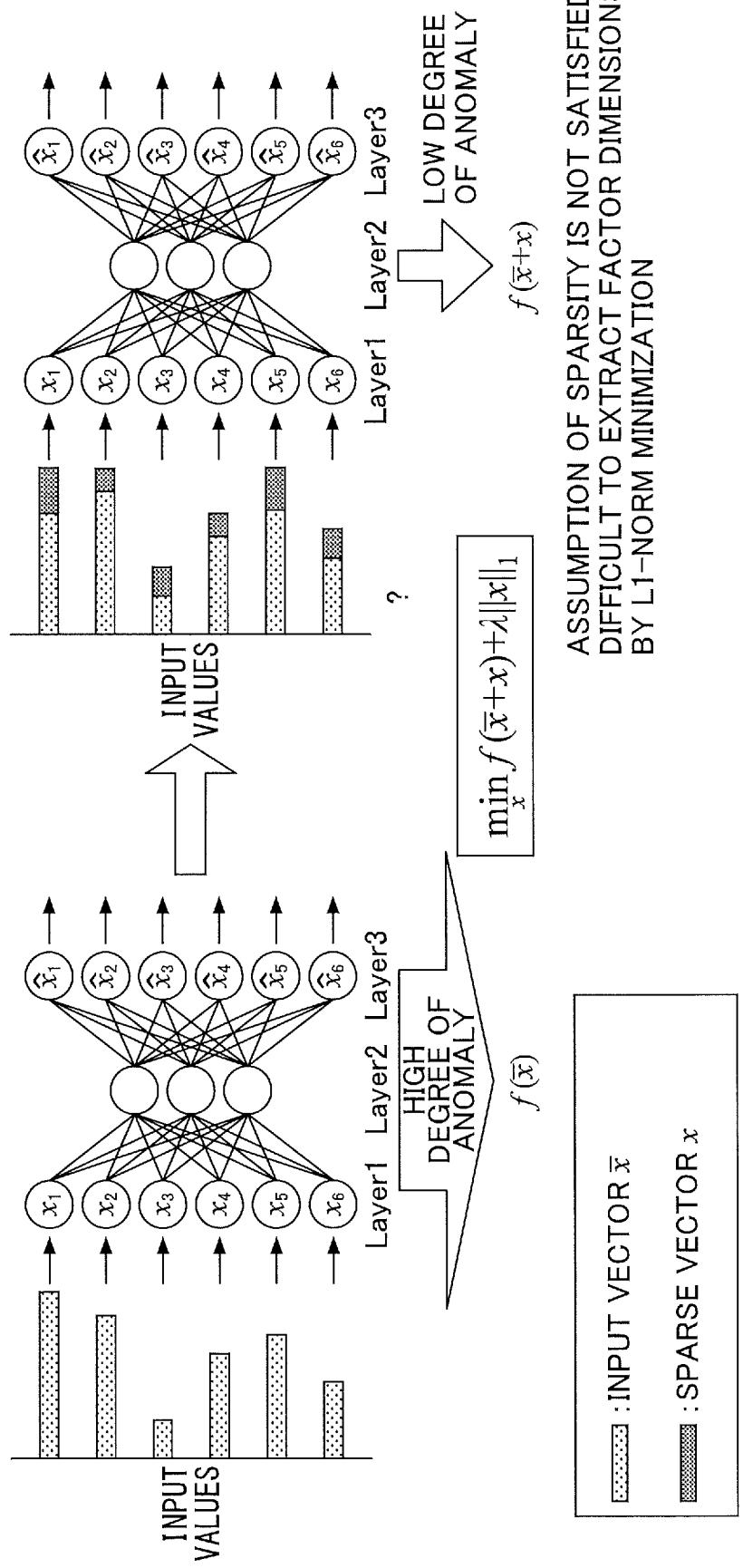
FIG. 2 is a diagram for illustrating the problem to be solved.
Figure 3:
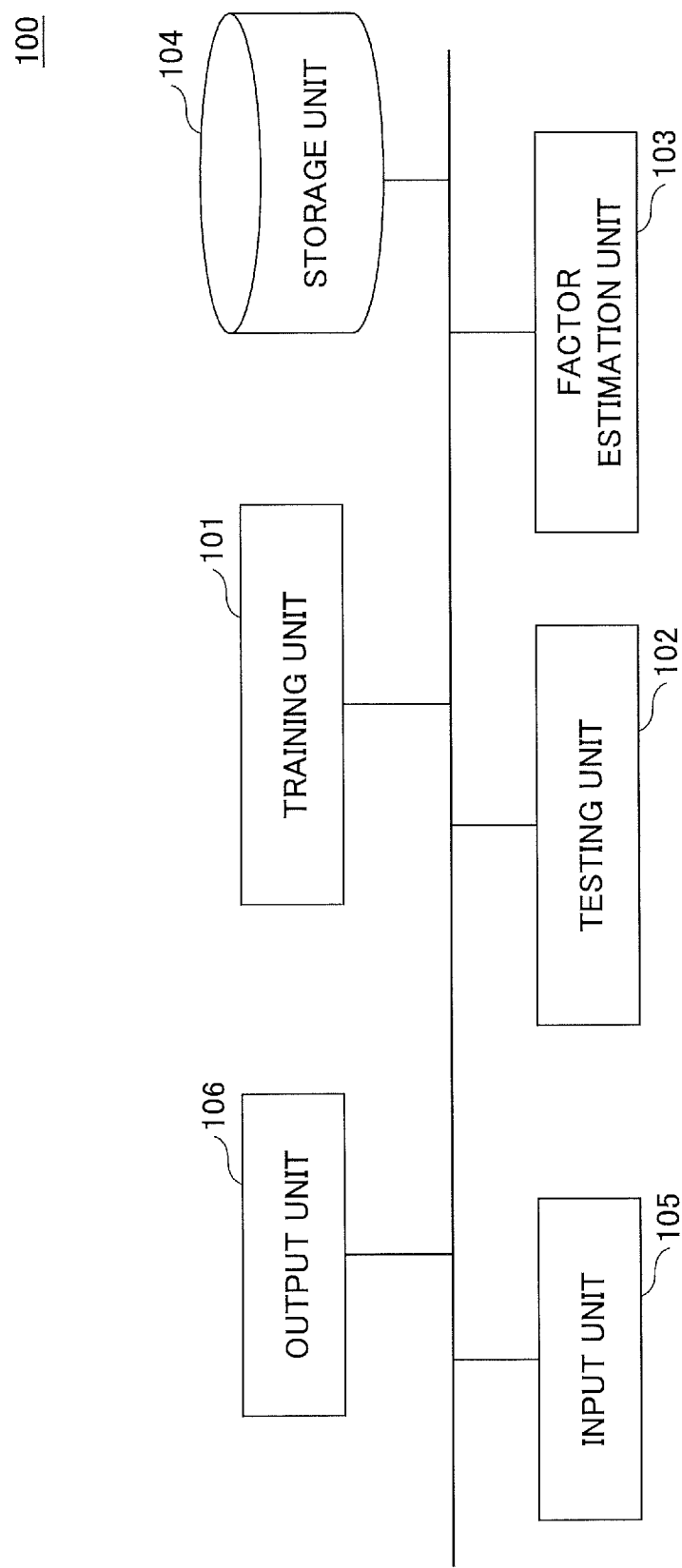
FIG. 3 is a functional configuration diagram of an anomaly factor estimation apparatus 100 in an embodiment according to the present invention.

FIG. 3 illustrates the functional configuration of an anomaly factor estimation apparatus 100 in the present embodiment. As illustrated in FIG. 3, the anomaly factor estimation apparatus 100 includes a training unit 101, a testing unit 102, a factor estimation unit 103, a storage unit 104, an input unit 105, and an output unit 106. The processing contents executed by each unit will be described in application examples, which will be described later.

The anomaly factor estimation apparatus 100 described above can be implemented, for example, by having a computer execute a program that describes the process described in the present embodiment.

In other words, the anomaly factor estimation apparatus 100 can be implemented by executing a program corresponding to the processing executed on the anomaly factor estimation apparatus 100 using hardware resources such as a CPU and a memory built in the computer. The program can be recorded on a computer-readable recording medium (a portable memory, etc.), to be stored and/or distributed. It is also possible to provide the program described above via a network such as the Internet or e-mail.

Figure 4:
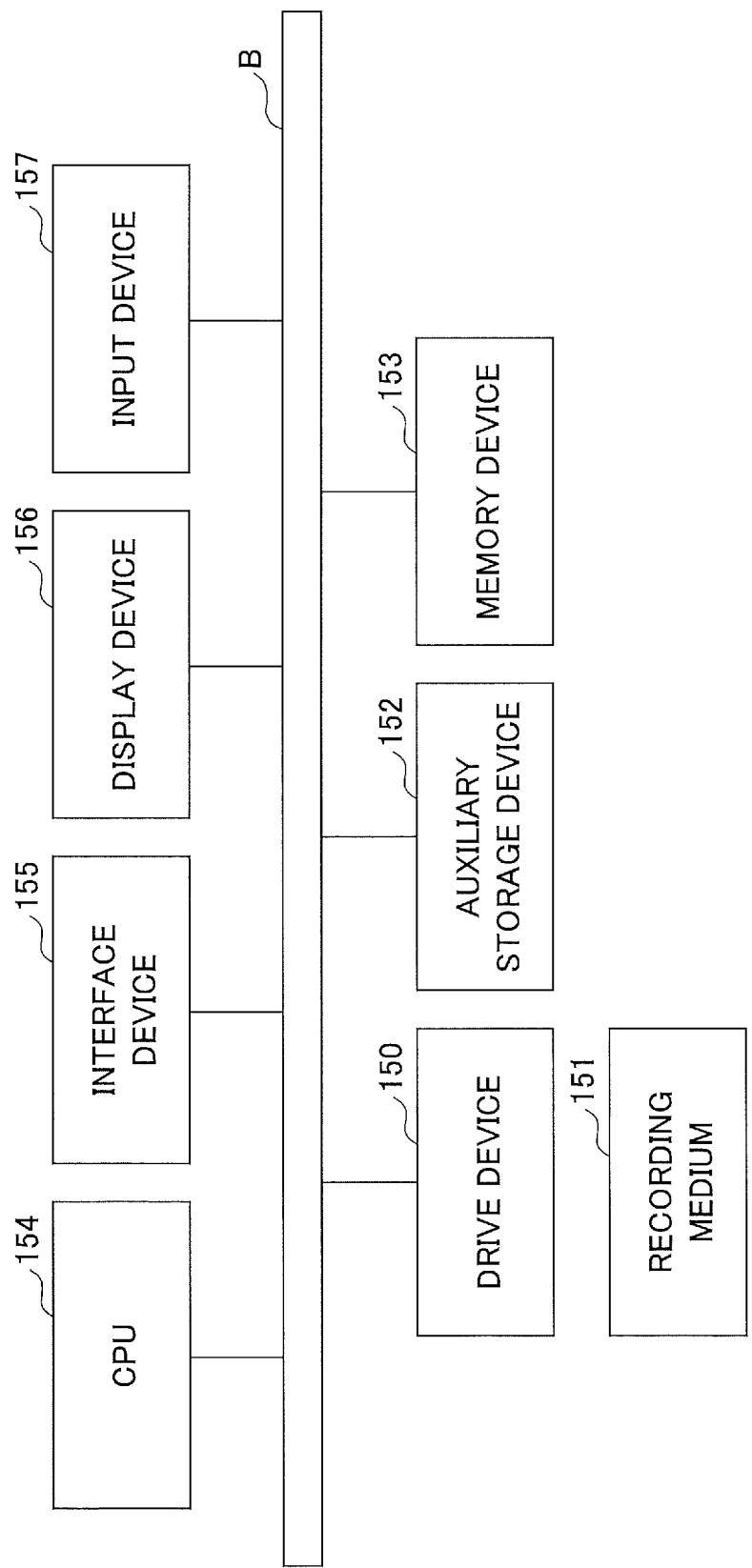
FIG. 4 is a diagram illustrating an example of a hardware configuration of the anomaly factor estimation apparatus 100.

FIG. 4 is a diagram illustrating an example of the hardware configuration of a computer in the present embodiment. The computer in FIG. 4 includes a drive device 150, an auxiliary storage device 152, a memory device 153, a CPU 154, an interface device 155, a display device 156, an input device 157, and the like, which are connected to each other via a bus B.

The program for implementing the processing on the computer is provided by a recording medium 151, for example, a CD-ROM or memory card. When the recording medium 151 on which the program is stored is set in the drive device 150, the program is installed in the auxiliary storage device 152, from the recording medium 151 via the drive device 150. However, installation of the program does not need to be executed necessarily with the recording medium 151, and may be downloaded from another computer via the network. The auxiliary storage device 152 stores the installed program, and also stores necessary files, data, and the like.

The memory device 153 reads and stores the program from the auxiliary storage device 152 in response to an activation command of the program. The CPU 154 implements the functions associated with the anomaly factor estimation apparatus 100 according to the program stored in the memory device 153. The interface device 155 is used as an interface for connecting to the network. The display device 156 displays a GUI (Graphical User Interface) generated by the program, and the like. The input device 157 is constituted with a keyboard, a mouse, buttons, a touch panel, or the like, to be used for inputting various operating commands.

In the following, the application examples 1 to 8 will be described as detailed operational examples of the anomaly factor estimation apparatus 100. In each of the following application examples, an autoencoder is used as the anomaly detection algorithm; however, as the anomaly detection algorithm, a variational autoencoder, an adversarial autoencoder, or the like may be used. As for the variational autoencoder, Kingma, Diederik P., and Max Welling, "Auto-encoding variational bayes", arXiv preprint arXiv: 1312.6114 (2013) and the like may be referenced. Also, as for the adversarial autoencoder, Makhzani, Alireza, et al., "Adversarial autoencoders", arXiv preprint arXiv: 1511.05644 (2015) and the like may be referenced.

Note that "variational autoencoder", "adversarial autoencoder", "denoising autoencoder", "denoising variational autoencoder", and autoencoders that are neither of these may be collectively referred to as the autoencoder. Also, the present invention can also be applied to the case of using a model other than existing autoencoders as the anomaly detection model.

In the application examples 1 to 8 described below, the application example 1 is a base application example, and for the application examples following the application example 1, different parts from the application example 1 (or specific application examples following the application example 1) will be described. However, the application examples 1 to 8 can be implemented in any combination as long as no inconsistency is introduced. For example, as will be described later with reference to FIG. 9, multiple application examples can be combined discretionarily, for example, "application example 7 (variational autoencoder)+application example 5 (L0 norm)+application example 2 (denoising)+application example 1 (deviation as the degree of contribution)", and the like.

In the anomaly factor estimation apparatus 100, a basic example of operations of training and testing in the anomaly detection method using an autoencoder are as follows.

For data x represented by a multidimensional numerical vector, the training unit 101 trains a mapping f to a space Z different from the original data space X, and a mapping g from Z to the original data space X, so as to maximize the likelihood of x expressed as $p(x|\theta(g(f(x)))$ for an element of the parameter $\theta(g(f(x)))$ obtained by projecting x to Z by f and further projecting to the original data space by g, when normal data is given as x.

For test data subject to the anomaly detection, the testing unit 102 projects the test data from X to Z by the mapping f, and regards the data as an anomaly in the case where the likelihood of the result of projection from Z to X by the mapping g is low.

Application Example 1

First, the application example 1 will be described. In the application example 1, when estimating the factors in the case where the test data is determined to be an anomaly by execution of the anomaly detection algorithm, the anomaly factor estimation apparatus 100 estimates the dimensionality of the factors based on the likelihood of each dimension.

Figure 5:
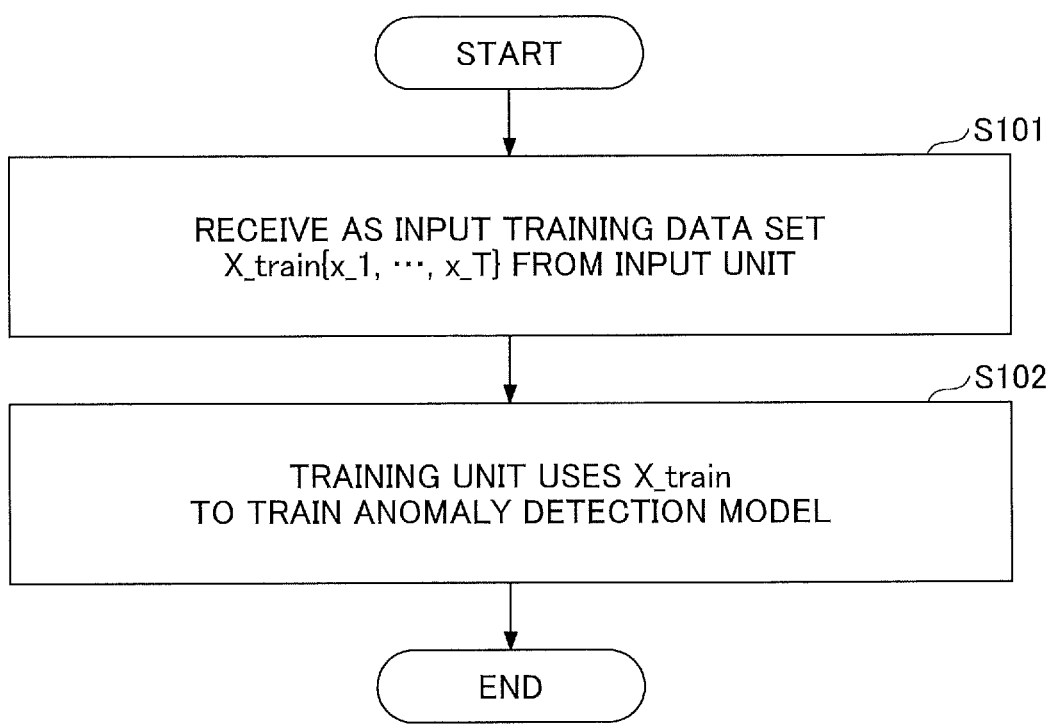
FIG. 5 is a flow chart illustrating operations of the anomaly factor estimation apparatus 100 in a training phase in an application example 1.
Figure 6:
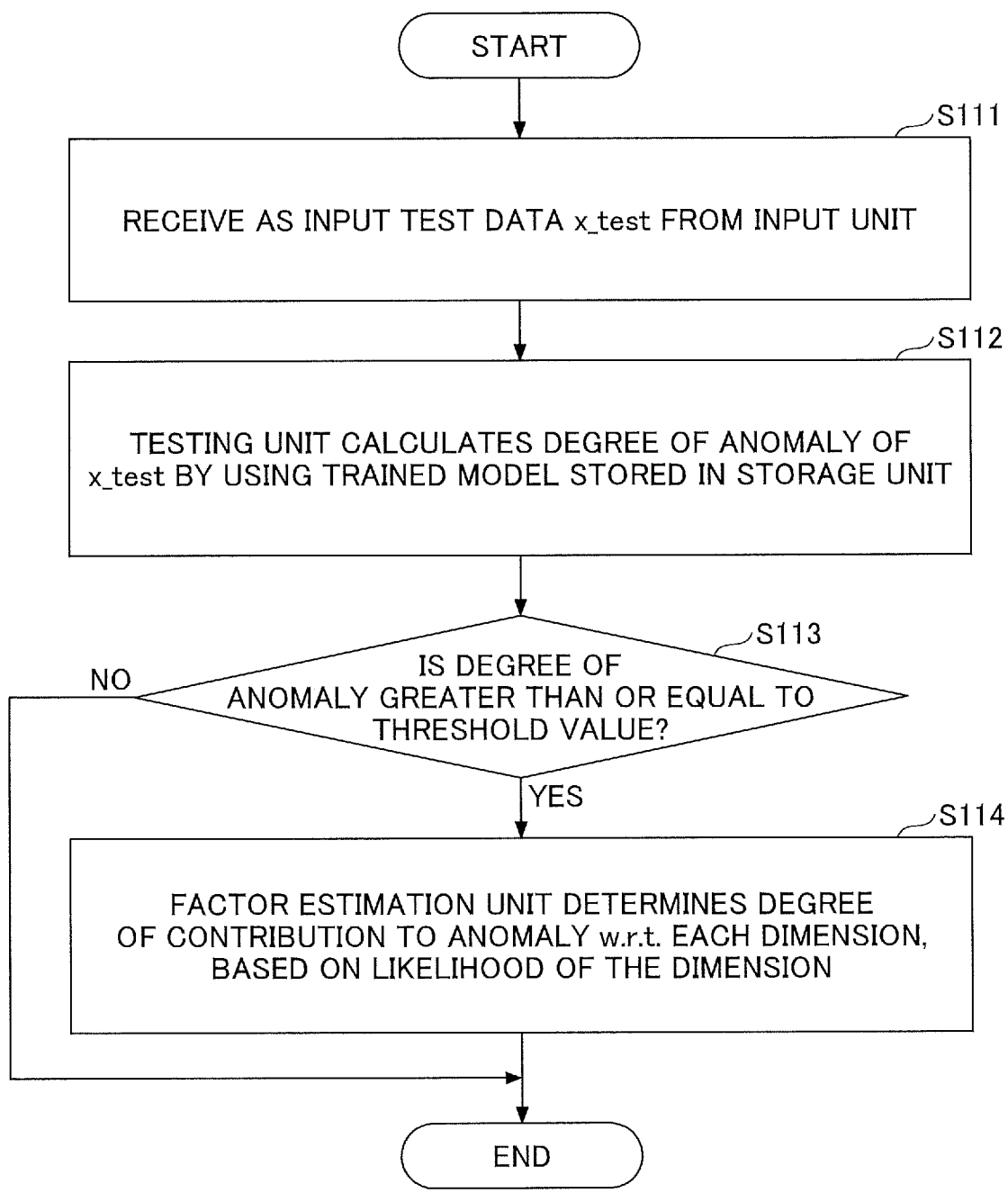
FIG. 6 is a flow chart illustrating operations of the anomaly factor estimation apparatus 100 in a testing phase and a factor estimation phase in the application example 1.

Operations of the anomaly factor estimation apparatus 100 in the application example 1 will be described with reference to the steps of the flow chart illustrated in FIGS. 5 and 6. S as in "S101" and the like in each flow chart is an abbreviation of "Step". The operations of the anomaly factor estimation apparatus 100 are constituted with a training phase (FIG. 5); and a testing phase and a factor estimation phase (FIG. 6). First, the training phase in FIG. 5 will be described.

<Training Phase: S101>

In the training phase, first, a training data set X_train={x_1, . . . , x_T} is input into the anomaly factor estimation apparatus 100 from the input unit 105.

<Training Phase: S102>

Next, the training unit 101 trains an anomaly detection model (autoencoder) using the input training data set. In the application example 1, conventional methods of training in general autoencoders can be used.

Conventional training in a general autoencoder is performed so as to make the mean square error $(x\_i-y\_i)^2/N$ (where N represents the dimensionality) between input data x and output data y=g(f(x)) smaller. This is equivalent to performing training to maximize the likelihood by minimizing the negative log likelihood in the case of defining $p(x|\theta(g(f(x))))$ as a normal distribution with the mean being y, the variance being 1, and all covariances being 0.

Upon completion of the training, the trained model is stored in the storage unit 104, and the process proceeds to the testing phase. Operations of the anomaly factor estimation apparatus 100 in the testing phase will be described with reference to FIG. 6.

<Testing Phase: S111>

The test data x_test is input into the anomaly factor estimation apparatus 100 from the input unit 105.

<Testing Phase: S112>

Next, in substantially the same way as in the conventional techniques, the testing unit 102 calculates the degree of anomalousness of x_test as the mean square error $(x\_i-y\_i)^2/N$, by using the trained model (anomaly detection model) stored in the storage unit 104.

<Testing Phase: S113>

The testing unit 102 determines whether the calculated degree of anomalousness is greater than or equal to a predetermined threshold value, and if not greater than or equal to the predetermined threshold value, ends the process of this time. If the degree of anomalousness is greater than or equal to the predetermined threshold value, x_test is regarded as anomaly data and transmitted to the factor estimation unit 102, and the process proceeds to the factor estimation phase.

<Factor Estimation Phase: S114>

Based on the likelihood (here, $p(x\_test\_i|\theta(g(f(x\_test))))$ $=\exp(-(x\_test\_i-y\_i)^2/2)/(2\pi)^{(1/2)})$ of each dimension (represented by i) in x_test, the factor estimation unit 103 determines the degree of contribution to the anomaly in the dimension. The determined degree of contribution is output from the output unit 106. In this way, by determining the degree of contribution to the anomaly in each dimension based on the likelihood of the dimension, it is possible to extract factor dimensions based on the "likelihood" of each dimension taking that value, without assuming sparsity with respect to the dimensionality of factor dimensions as in the existing techniques.

For example, it can be considered that a greater contribution to the anomaly makes the likelihood lower; therefore, the negated likelihood, the reciprocal of the likelihood, the negated log-likelihood, the reciprocal of the log-likelihood, or the like can be used as the degree of contribution. Also, in the case where it is desirable to have the degree of contribution take a positive or negative value depending on being larger or smaller than in the normal time, the factor estimation unit 103 may calculate, for example, the deviation from the mean $(x\_i-y\_i)$ as the degree of contribution.

Also, in the case of an anomaly detection algorithm where the likelihood function is given as a general normal distribution (variational autoencoder, etc.), the factor estimation unit 103 may calculate the deviation $(x\_i-\mu\_i/\sigma\_i)$ taking the variance into consideration as the degree of contribution, where $\mu$ represents the mean and $\sigma$ represents the standard deviation.

Application Example 2

Figure 7:
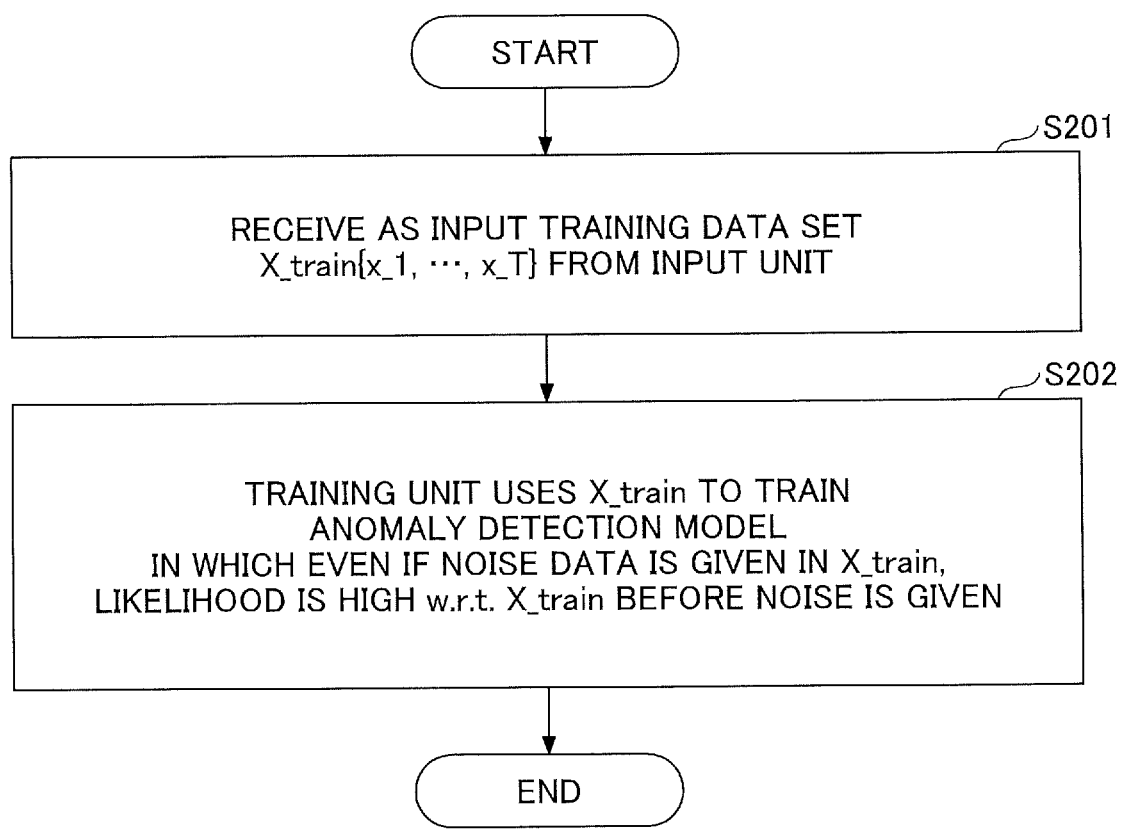
FIG. 7 is a flow chart illustrating operations of the anomaly factor estimation apparatus 100 in a training phase in an application example 2.

Next, the application example 2 will be described. In the application example 2, the training phase is different from that in the application example 1. The processing contents in the testing phase and the factor estimation phase in the application example 2 are the same as in the application example 1. The processing in the training phase in the application example 2 will be described with reference to the flow chart in FIG. 7.

<Training Phase: S201>

In the training phase, first, a training data set X_train={x_1, . . . , x_T} is input into the anomaly factor estimation apparatus 100 from the input unit 105.

<Training Phase: S202>

Next, the training unit 101 uses X_train to train an anomaly detection model such that even if noise data is given to X_train, the likelihood is high with respect to X_train before the noise is given. In other words, the training of the anomaly detection model proceeds such that even if inputting data to which noise has been given, a smaller mean square error is obtained for the data before the noise is given.

Denoting test data including an anomaly as data x', although an error may occur in the calculation of the likelihood described in the factor estimation phase in the application example 1, by training a denoised model as in S202 described above, it becomes possible to remove the anomaly as noise, and thereby, to calculate the likelihood $p(x'\_i|\theta(g(f(x'))))$ as correctly as possible.

The model trained in the application example 2 corresponds to a denoising autoencoder in the case where the anomaly detection algorithm is an autoencoder, or corresponds to a denoising variational autoencoder in the case of a variational autoencoder. As for the denoising autoencoder, Vincent, Pascal, et al. "Extracting and composing robust features with denoising autoencoders", Proceedings of the 25th international conference on Machine learning. ACM, 2008, and the like may be referenced. Also, as for the denoising variational autoencoder, Im, Daniel Jiwoong, et al. "Denoising Criterion for Variational Auto-Encoding Framework", AAAI. 2017., and the like may be referenced.

Application Example 3

Figure 8:
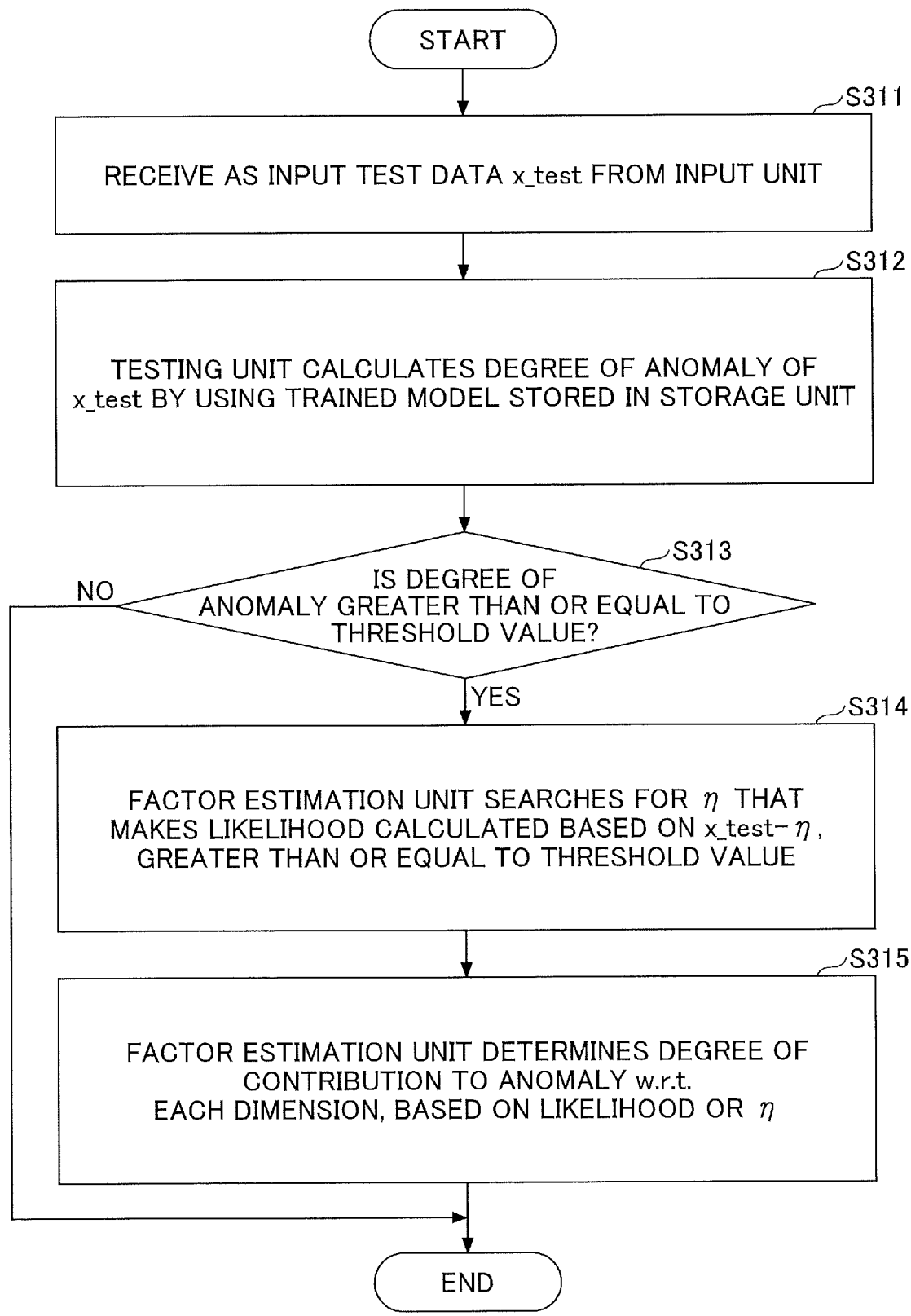
FIG. 8 is a flow chart illustrating operations of the anomaly factor estimation apparatus 100 in a testing phase and a factor estimation phase in an application example 3.

Next, the application example 3 will be described. In the application example 3, the training phase is the same as in the application example 1 or the application example 2, the processing contents in the factor estimation phase in the application example 3 are different from those in the application examples 1 and 2, and the processing in the testing phase and the factor estimation phase in the application example 3 will be described with reference to the flow chart in FIG. 8.

<Testing Phase: S311>

The test data x_test is input into the anomaly factor estimation apparatus 100 from the input unit 105.

<Testing Phase: S312>

Next, the testing unit 102 calculates the degree of anomalousness of x_test as the mean square error $(x\_i-y\_i)^2/N$, by using the trained model stored in the storage unit 104.

<Testing Phase: S313>

The testing unit 102 determines whether the calculated degree of anomalousness is greater than or equal to a predetermined threshold value, and if not greater than or equal to the predetermined threshold value, ends the process of this time. If the degree of anomalousness is greater than or equal to the predetermined threshold value, x_test is regarded as anomaly data and transmitted to the factor estimation unit 102, and the process proceeds to the factor estimation phase.

<Factor Estimation Phase: S314>

The factor estimation unit 103 searches for $\eta$ that makes the likelihood calculated based on x_test-$\eta$ (where $\eta$ is a vector) greater than or equal to a threshold value. In other words, in the application example 3, instead of $p(x\_test\_i|\theta(g(f(x\_test))))$ used in the application example 1, a vector $\eta$ that makes $p(x\_test-\eta|g(f(x\_test-\eta))))$ greater than or equal to the threshold value is searched.

Here, as $\eta$ is calculated to make $p(x\_test-\eta|g(f(x\_test-\eta))))$ greater, $\eta$ is a vector that represents how small the degree of anomalousness becomes when each dimension of x_test is moved. As the search method of $\eta$, a steepest ascent method that simply maximizes $p(x\_test-\eta|\theta(g(f(x\_test-\eta))))$, or an equivalent method such as a steepest descent method that minimizes the negative log likelihood $-\log p(x\_test-\eta|\theta(g(f(x\_test-\eta))))$ can be used.

<Factor Estimation Phase: S315>

The factor estimation unit 103 calculates the degree of contribution to the anomaly for each dimension based on $\eta$ or the likelihood $(p(x\_test\_i|\theta(g(f(x\_test-\eta)))))$. In other words, $\eta$ may be regarded as the degree of contribution as it is, or the likelihood may be used to calculate the degree of contribution in substantially the same way as in the application example 1.

Application Example 4

Next, the application example 4 will be described. The application example 4 is based on the application example 3. In the application example 4, in the factor estimation phase (S314) in the application example 3, a norm term of $L\_p$ as $\|\eta\|\_p$ is given to $\eta$ before searching for $\eta$. This is to obtain a more plausible calculation result by performing a search based on an assumption that in the case of input data being multidimensional, the number of dimensions as the factors of an anomaly would be limited.

In the case of performing a search by minimizing the negative log likelihood, if p=2, a steepest descent method with a L2 norm term of $\lambda\|\eta\|\_2^2$ can be used. In other words, a steepest descent method that minimizes $-\log p(x\_test-\eta|\theta(g(f(x\_test-\eta))))+\lambda\|\eta\|\_2^2$ is used.

Here, $\lambda$ is a parameter that is given in advance and in some cases, autonomously adjusted during the search. If p=1, the L1 norm term is $\lambda\|\eta\|\_1$, and as the minimization method with the norm term of L1, for example, a proximal gradient method can be used. As for proximity gradient methods, Beck, Amir, and Marc Teboulle, "A fast iterative shrinkage-thresholding algorithm for linear inverse problems", SIAM journal on imaging sciences 2.1 (2009): 183-202, and the like may be referenced. If p=0, for example, a method of making all obtained solutions be zero except for the higher K dimensions, a method of repeating the steepest descent method during the search while making the slope with respect to the degree of anomalousness (=negative log likelihood) be zero for all gradients except for the higher K dimensions, or the like can be used. Here, K is a parameter that is given in advance, and in some cases, autonomously adjusted during the search.

Application Example 5

Next, the application example 5 will be described. The application example 5 is also based on the application example 3. In the application example 5, in the factor estimation phase (S314) in the application example 3, for each iteration of the search, the factor estimation unit 103 calculates the likelihood of each dimension calculated using a search point $\eta\_t$ at that time, and adjusts the objective function according to the likelihood of the dimension $p(x\_i|\theta(g(f(x-\eta\_t)))$.

For example, in the case of considering the log likelihood $-\log p(x\_test-\eta|\theta(g(f(x\_test-\eta))))=\Sigma\_i=1^N$ $(-\log p(x\_test\_i-\eta\_i|\theta(g(f(x\_test-\eta))))\_i)$ (where N is the dimensionality of the entire space) as the objective function where the dimensions are conditionally independent, denoting the reciprocal of the likelihood of each dimension calculated using the search point $\eta\_t$ at the search time as $w\_i=1/p(x\_i|\theta(g(f(x-\eta\_t)))$, then, it can be considered that the objective function is given as the log likelihood $\Sigma\_i=1^N (w\_i(-\log p(x\_test\_i-\eta\_i|\theta(g(f(x\_test-\eta)))\_i))$ weighted by $w\_i$. This is because a dimension having a higher likelihood is unlikely to be the factor of an anomaly; therefore, rather than increasing the likelihood of such a dimension, the likelihood of lower-likelihood dimensions are increased to be emphasized. Meanwhile, in the case of performing a search to clarify dimensions related to an anomaly by increasing the likelihood of the dimensions other than those as the factors of the anomaly, the log likelihood $\Sigma\_i$ where the likelihood of each dimension i is used as is as the weight $w\_i$ can be used as the objective function. Alternatively, a method may be considered in which the objective function is a log likelihood $\Sigma\_i$ where $w\_i=0$ if the likelihood is less than a predetermined threshold value, or if greater, $w\_i=1$.

Also, it is possible to combine with the application example 4. In the case of combining with the application example 4, the norm term given to the objective function may be used for the likelihood to be adjusted. As the method of adjusting the norm term, for example, if p=1 or 2, a norm term of $\lambda\|w\cdot\eta\|$ weighted by the likelihood (or the log likelihood or a value proportional to that) of each dimension as the weight $w\_i$ can be used. This is because a dimension having a high likelihood is unlikely to be the factor of an anomaly even during the search; therefore, the dimensions corresponding to $\eta$ are not to be moved as far as possible. If p=0, for example, it is possible to use a method that repeats a steepest descent method while making all gradients other than the lower K dimensions of the likelihood be zero.

Application Example 6

Next, the application example 6 will be described. In the application example 6, in the factor estimation phase (S114) in the application example 1, the factor estimation unit 103 searches for a vector that makes $p(x|\theta(g(f(x\_test)-\xi))$ greater than or equal to a threshold value, to give the degree of contribution to an anomaly for each dimension based on the likelihood of the dimension $p(x\_i|\theta(g(f(x)-\xi))$.

In contrast to the search performed in the input data space in the application examples 3 to 5, this operation is equivalent to searching in a latent-variable space for "a value in the case where x_test is normal and mapped to the latent-variable space", and thereby, there is a chance of efficiently performing the search to extract factor dimensions within a shorter time in the case where the size of the latent-variable space is smaller than that of the input data space. The search method and the calculation of the degree of contribution based on the likelihood can be performed in substantially the same way as in the application examples 3 to 5. Also, instead of searching for values mapped into the latent-variable space, a search may be made directly with respect to the parameter of the distribution g(•). Also, in the case of combining with the application example 5, for each iteration of the search, the likelihood of each dimension calculated using a search point $\xi\_t$ at that time may be calculated to adjust the objective function according to the likelihood of the dimension $p(x\_i|\theta(g(f(x)-\xi\_t))$.

Application Example 7

Next, the application example 7 will be described. In the application example 7, in the training phase (S102) in the application example 1, the training unit 101 performs training such that a latent variable comes close to a distribution p_z(z) set discretionarily. This gives a restriction on a mapping to latent variables and a more efficient mapping using the structure of the input data can be learned, and thereby, it can be expected that features of normal data are learned more precisely, and the factor dimensions can be extracted with improved accuracy. A method of setting p_z(z) as the standard distribution and giving the KL distance to the loss function during training corresponds to a variational autoencoder; and a method of setting p_z(z) as any distribution, and repeating the training of a discriminator that classifies f(x) and p_z(z) and the training of f erroneously classified by the discriminator corresponds to an adversarial autoencoder.

Application Example 8

Next, the application example 8 will be described. In the application example 8, in the factor estimation phase (S114) in the application example 1, the factor estimation unit 103 searches for a vector $\eta$ that makes $p(x\_test-\eta|\theta(g(f(x\_test-\eta))))$ greater than or equal to the threshold value, instead of the likelihood of the degree of contribution to the anomaly, and regards $\eta$ as the degree of contribution. This application example corresponds to regarding $\eta$ as the degree of contribution as is in the application example 3.

Summary of Application Examples

As described above, for data x represented by a multidimensional numerical vector, the anomaly factor estimation apparatus 100 trains a mapping f to a space Z different from the original data space X, and a mapping g from Z to the original data space X, so as to maximize the likelihood of x expressed as $p(x|\theta(g(f(x)))$ for an element of the parameter $\theta(g(f(x))$ obtained by projecting x to Z by f and further projecting to the original data space by g, when normal data is given as x; and for test data subject to the anomaly detection, the anomaly factor estimation apparatus 100 performs anomaly detection by projecting the test data from X to Z by the mapping f, and regarding the data as an anomaly in the case where the likelihood of the result of projection from Z to X by the mapping g is low.

In the application example 1, the anomaly factor estimation apparatus 100 calculates the degree of contribution to an anomaly for each dimension based on the likelihood $p(x\_i|\theta(g(f(x)))$ of the dimension in the case where the test data is determined to be anomalous.

In the application example 2, in the operations in the application example 1, the anomaly factor estimation apparatus 100 performs training, upon input of data x' obtained by giving noise to input data x, to maximize the likelihood $p(x|\theta(g(f(x'))))$ of x before giving the noise.

In the application example 3, in the operations in the application example 1, the anomaly factor estimation apparatus 100 searches for $\eta$ that makes $p(x-\eta|\theta(g(f(x-\eta))))$ greater than or equal to the threshold value, to calculate the degree of contribution to an anomaly for each dimension based on $\eta$ or the likelihood of the dimension $p(x\_i|\theta(g(f(x-\eta))))$.

In the application example 4, in the operations in the application example 3, the anomaly factor estimation apparatus 100 gives an L_p norm term of $\|\eta\|\_p$ when searching for $\eta$.

In the application example 5, in the operations in the application example 3, in each iteration of the search, the anomaly factor estimation apparatus 100 gives an objective function when searching for $\eta$, based on the likelihood of each dimension $p(x\_i|\theta(g(f(x-\eta\_t))))$ calculated using a search point $\eta\_t$ at that time.

In the application example 6, in the operations in the application example 1, the anomaly factor estimation apparatus 100 searches for that makes $p(x|\theta(g(f(x)-\xi))$ greater than or equal to the threshold value, to calculate the degree of contribution to an anomaly for each dimension based on the likelihood of the dimension $p(x\_i|\theta(g(f(x)-\xi))$.

In the application example 7, in the operations in the application example 1, the anomaly factor estimation apparatus 100 trains f and g such that when training f and g, z obtained by mapping the input data into the space Z comes close to a distribution p_z(z) set discretionarily.

In the application example 8, in the operations in the application example 1, the anomaly factor estimation apparatus 100 searches for $\eta$ that makes $p(x-\eta|\theta(g(f(x-\eta))))$ greater than or equal to the threshold value, instead of the likelihood of the degree of contribution to an anomaly for a dimension, to set $\eta$ as the degree of contribution.

Effects of Application Examples

By the anomaly factor estimation apparatus 100 according to the embodiment of the present invention that uses an anomaly detection algorithm to calculate the degree of anomalousness of input data, when an anomaly is detected, it becomes possible to estimate the factor of an anomaly. Evaluation results actually obtained by performing the factor estimation with combinations of the application examples 1, 2, 5, 7, and 8 will be described below.

Here, the evaluation results that used benchmark data for anomaly detection known as satellite data (Goldstein, Markus, 2015, "Unsupervised Anomaly Detection Benchmark", https://doi.org/10.7910/DVN/OPQMVF, Harvard Dataverse, V1, UNF:6:EnytiA6wCIilzHetzQQV7A==) (36 dimensions of continuous variables) are presented. M dimensions in normal data were randomly selected, and each value was added with −r(xi, max-xi, min) if the value was greater than the average in the normal time (r is a random number following a uniform distribution of 1 to 2), or added with +r if less than the average value, to generate anomaly data.

Figure 9:
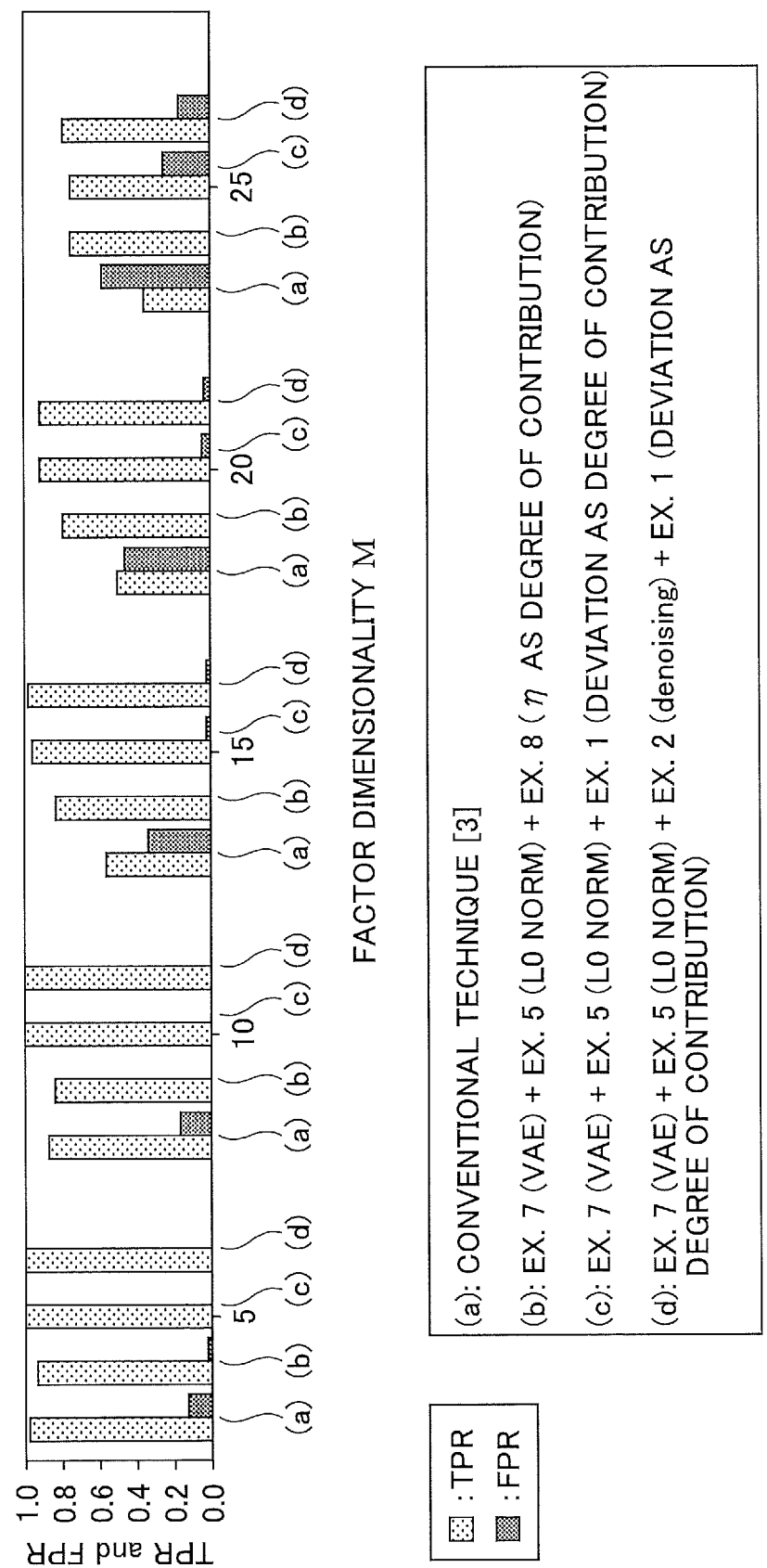
FIG. 9 is a diagram illustrating evaluation results of an anomaly factor estimation apparatus.

The degree of contribution was calculated using methods that combine the application example 1, 2, 5, 7, and/or 8, and a dimension exceeding a threshold value was estimated as the factor dimension. FIG. 9 illustrates results of comparisons of the mean values of the estimated accuracy when simulation was performed 10 times for the estimation. The simulation was performed for each of (a), (b), (c), and (d) as illustrated in FIG. 9, which are (a) conventional technique (Non-patent document 3); (b) application example 7 (variational autoencoder)+application example 5 (L0 norm)+application example 8 (η as the degree of contribution); (c) application example 7 (variational autoencoder)+application example 5 (L0 norm)+application example 1 (deviation as the degree of contribution); and (d) application example 7 (variational autoencoder)+application example 5 (L0 norm)+application example 2 (denoising)+application example 1 (deviation as the degree of contribution).

Here, TPR stands for True Positive Ratio, which means the ratio of determinations that factor dimensions extracted as the factor dimensions were actually the factor dimensions; and FPR stands for False Positive Ratio, which means the ratio of erroneous determinations that factor dimensions extracted as the factor dimensions were not the factor dimensions. Therefore, a TPR closer to 1 and an FPR closer to 0 indicate that the factor estimation was performed with higher accuracy.

As illustrated in FIG. 9, by the methods of combining a variational autoencoder and the L0 norm minimization, especially by the method (d) of performing training of denoising in the application example 2 and defining the deviation of the distribution as the degree of contribution, even if the dimensionality of factor dimensions increases, the factor dimensions can be estimated with higher accuracy compared to the existing method.

Summary of Embodiment

As described above, according to the present embodiment, an anomaly factor estimation apparatus is provided to include a training unit configured to train an anomaly detection model for performing anomaly detection based on an error of output data with respect to input data represented by a multidimensional numerical vector; a testing unit configured to input test data into the anomaly detection model, to determine whether the test data corresponds to an anomaly based on output data output from the anomaly detection model and the test data; and a factor estimation unit configured to calculate a degree of contribution to the anomaly for each dimension of the test data based on a likelihood of said each dimension, in response to the testing unit determining that the test data corresponds to the anomaly.

The training unit may train the anomaly detection model so as to output data in which noise given in advance to the input data is denoised.

The factor estimation unit may search for a vector that changes a value of said each dimension of the test data so as to make a degree of anomalousness of the test data smaller, to calculate the degree of contribution by using the vector.

The factor estimation unit may search for a vector that changes a value of said each dimension of the test data so as to make the degree of anomalousness of the test data smaller, and instead of calculating the degree of contribution based on the likelihood of said each dimension, sets the vector as the degree of contribution.

The factor estimation unit may give an objective function in the search based on the likelihood of said each dimension calculated by using a vector at a search point at a point in time in each iteration in the search.

The training unit may perform the training using a latent variable, to perform the training so as to make the latent variable come close to a predetermined distribution.

As above, the embodiment has been described. Note that the present invention is not limited to such a specific embodiment, and various modifications and alterations can be made within the scope of the subject matters of the present invention described in the claims.

The present patent application claims priority based on Japanese Patent Application No. 2018-154189 filed on Aug. 20, 2018, and the entire contents of Japanese Patent Application No. 2018-154189 are incorporated herein by reference.

LIST OF REFERENCE SYMBOLS

100 anomaly factor estimation apparatus
101 training unit
102 testing unit
103 factor estimation unit
104 storage unit
105 input unit
106 output unit
150 drive device
151 recording medium
152 auxiliary storage device
153 memory device
154 CPU
155 interface device
156 display device
157 input device

The invention claimed is:

1. An anomaly factor estimation apparatus comprising:
a memory; and
a processor configured to execute
training an anomaly detection model for performing anomaly detection based on an error of output data with respect to input data represented by a multidimensional numerical vector;
inputting test data into the anomaly detection model, to determine whether the test data corresponds to an anomaly based on output data output from the anomaly detection model and the test data; and
calculating a degree of contribution to the anomaly for each dimension of the test data based on a likelihood of said each dimension in response to determining that the test data corresponds to the anomaly.

2. The anomaly factor estimation apparatus as claimed in claim 1, wherein the training trains the anomaly detection model so as to output data in which noise given in advance to the input data is denoised.

3. The anomaly factor estimation apparatus as claimed in claim 1, wherein the calculating searches for a vector that changes a value of said each dimension of the test data so as to make a degree of anomalousness of the test data smaller, to calculate the degree of contribution by using the vector.

4. The anomaly factor estimation apparatus as claimed in claim 3, wherein the calculating gives an objective function in the search based on the likelihood of said each dimension calculated by using a vector at a search point at a point in time in each iteration in the search.

5. The anomaly factor estimation apparatus as claimed in claim 1, wherein the calculating searches for a vector that changes a value of said each dimension of the test data so as to make the degree of anomalousness of the test data smaller, and instead of calculating the degree of contribution based on the likelihood of said each dimension, sets the vector as the degree of contribution.

6. The anomaly factor estimation apparatus as claimed in claim 5, wherein the calculating gives an objective function in the search based on the likelihood of said each dimension calculated by using a vector at a search point at a point in time in each iteration in the search.

7. The anomaly factor estimation apparatus as claimed in claim 1, wherein the training uses a latent variable, to perform the training so as to make the latent variable come close to a predetermined distribution.

8. An anomaly factor estimation method executed by an anomaly factor estimation apparatus including a memory and a processor, the method comprising:
   training an anomaly detection model for performing anomaly detection based on an error of output data with respect to input data represented by a multidimensional numerical vector;
   inputting test data into the anomaly detection model, to determine whether the test data corresponds to an anomaly based on output data output from the anomaly detection model and the test data; and
   calculating a degree of contribution to the anomaly for each dimension of the test data based on a likelihood of said each dimension in response to determining that the test data corresponds to the anomaly.

9. A non-transitory computer-readable recording medium having computer-readable instructions stored thereon, which when executed, causes a computer to execute a process of system state estimation, the process comprising:
   training an anomaly detection model for performing anomaly detection based on an error of output data with respect to input data represented by a multidimensional numerical vector;
   inputting test data into the anomaly detection model, to determine whether the test data corresponds to an anomaly based on output data output from the anomaly detection model and the test data; and
   calculating a degree of contribution to the anomaly for each dimension of the test data based on a likelihood of said each dimension in response to determining that the test data corresponds to the anomaly.

* * * * *